March 8, 1932.  R. W. BURNETT  1,848,822
HANDWHEEL
Filed May 6, 1926
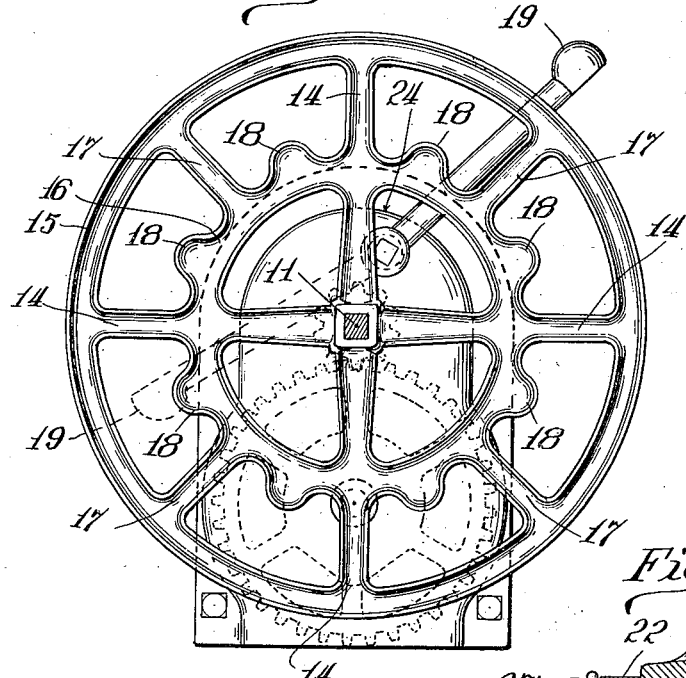
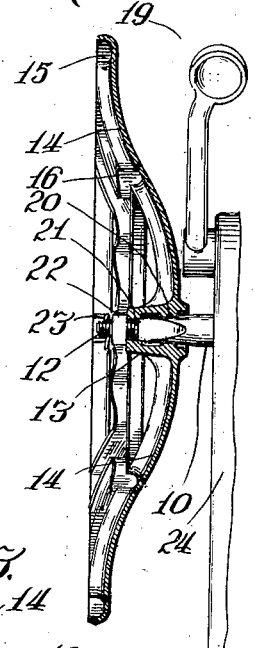
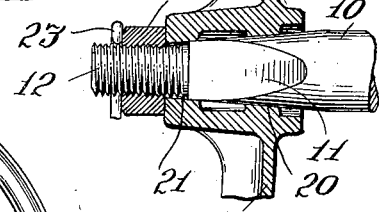
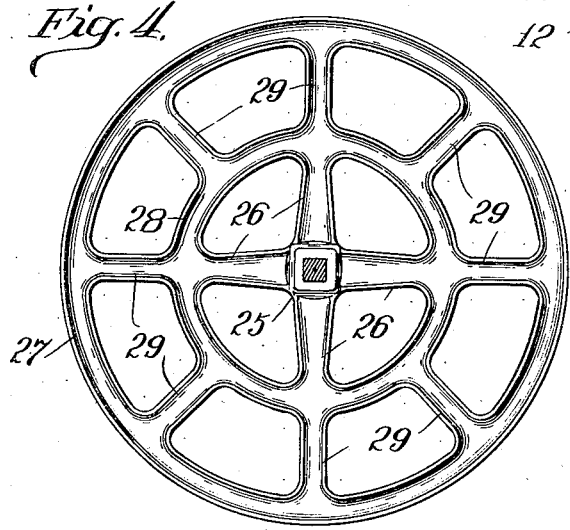
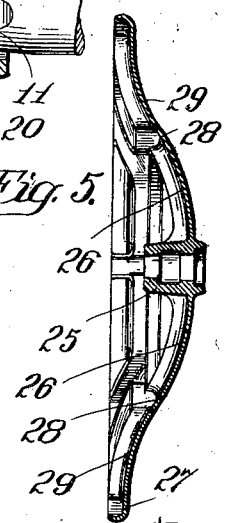

Patented Mar. 8, 1932

1,848,822

UNITED STATES PATENT OFFICE

RICHARD W. BURNETT, OF CHICAGO, ILLINOIS

HANDWHEEL

Application filed May 6, 1926. Serial No. 107,080.

My invention relates to a hand wheel for giving rotary movement to a shaft or machine element, and the object of the invention is to provide a hand wheel of unitary construction, preferably of cast metal, which will be light and strong; will provide convenient hand grips on the spokes as well as on the rim; will be so constructed as to prevent the operator from putting his hand between the spokes, with possible resultant injury; and which will be provided with curved outwardly projecting spokes so that the rim will lie in planes beyond the hub, whereby the fastening devices for securing the wheel to the shaft will be within or back of the plane bounding the outer edge of the rim.

The invention is illustrated in certain preferred embodiments in the accompanying drawings wherein Fig. 1 is a front view of the wheel, the wheel being shown in vertical position on the operating shaft of a brake setting mechanism.

Fig. 2 is a diametrical cross sectional view of the wheel and operating shaft.

Fig. 3 is a sectional view, on an enlarged scale, of the hub portion of the wheel and a part of the shaft and fastening means for securing the wheel to the shaft.

Fig. 4 is a front elevation of a modified form of wheel, and

Fig. 5 is a diametrical view of the wheel shown in Fig. 4.

Referring first to Figs. 1, 2 and 3, 10 designates an operating shaft having a tapered portion 11, square in cross section, and terminating in a threaded stud 12.

The wheel consists of a unitary metallic structure, preferably a casting, comprising a hub 13, outwardly or forwardly curved spokes 14, a rim 15, a circular web 16, intersecting the spokes 14, at points substantially midway between the hub and rim of the wheel; also, preferably, short spokes 17 extending from the web 16 to the rim 15 midway between the spokes 14. Preferably the spokes 14, rim 15, web 16 and short spokes 17 are all channel shaped in cross section. The web 16 is preferably provided with a series of outwardly extending projections 18 between each pair of spokes 14 and 17.

By this construction convenient hand grips are provided by the rim of the wheel and by the spokes 17 and the outer ends of spokes 14. Moreover, the openings are so divided by the circular web with its projections and by the provision of the additional short spokes 17 that it would not be an easy matter for the person operating the apparatus to put his hand through the wheel, for example, to operate the trip lever indicated at 19; the wheel being shown as forming part of a brake setting apparatus, which is released, involving very rapid backward rotation of the wheel, by manipulation of the trip lever, so that a careless or ignorant person might be severely injured by attempting to operate the trip by putting his hand through the wheel.

The hub 13 of the wheel is formed with two tapered surfaces 20, 21, which are square in cross section, for engagement with the squared portion 11 of the shaft 10. The wheel has a drive fit with the shaft and is held thereon by a nut 22 and cotter pin 23. These fastening devices, are arranged, due to the curvature of spokes 14, within or behind the plane which bounds the outer edge of the rim of the wheel. In use of the wheel for brake actuating mechanism on the end of the car, these constructions and arrangements are important. The rim of the wheel must be, according to Interstate Commerce Commission requirements, a certain distance from the trip lever 19 which stands between the wheel and the housing 24 (Fig. 2) of the brake actuating mechanism, and on the other hand there must be no projecting part on the car within a certain distance of the vertical plane passing through the pulling face of the coupler knuckle when the coupler is against the striking casting. A wheel constructed and attached to the operating shaft as herein shown, can be made to successfully meet these requirements and give clearances, as is desirable, considerably greater than are actually required.

A modified form of wheel structure is shown in Figs. 4 and 5, this form being intended particularly for wheels of smaller diameter than the wheels illustrated in Figs. 1 and 2. The wheel consists of hub 25, spokes 26, rim 27, intermediate circular web 28, but without the projections of web 16 of the other wheel, and short intermediate spokes 29 between web 28 and rim 27, the spokes, web and rim being channel-shaped in cross section, preferably, as in the case of the wheel shown in Figs. 1 and 2 to provide peripheral and radial hand grips.

I claim:

1. A hand wheel comprising, as a unitary metallic structure, a hub, a rim, spokes connecting the hub with the rim, and a circular web intersecting the spokes between the hub and rim, formed with outwardly extending projections between the spokes.

2. A hand wheel comprising, as a unitary metallic structure, a hub, a rim, spokes connecting the hub with the rim, a circular web intersecting the spokes between the hub and rim, and additional radial spokes extending between the web and the rim only, one between each of the other spokes, said web being formed between each spoke and the adjacent spoke with an outwardly extending projection.

3. A hand wheel structure formed with peripheral and radial hand grips and with projections into the spaces between said radial grips extending toward the peripheral grips.

4. A hand wheel structure formed with a peripheral portion providing peripheral and radial hand grips and projections into the spaces between said radial grips extending toward the peripheral grips, a hub, and spokes connecting said peripheral portion of the structure with said hub.

5. A hand wheel structure formed with a peripheral portion providing peripheral and radial hand grips and projections into the spaces between said radial grips extending toward the peripheral grips, a hub, and spokes connecting said peripheral portion of the structure with said hub, which are forwardly curved from the hub.

6. A hand wheel comprising a unitary metallic structure, a hub, a rim, spokes forwardly curved from the hub and connecting the hub with the rim, a circular web intersecting the spokes between the hub and rim, and additional radial spokes forwardly curved from said web and extending between the web and the rim only.

RICHARD W. BURNETT.

DISCLAIMER 1,848,822.—*Richard W. Burnett*, Chicago, Ill. HANDWHEEL. Patent dated March 8, 1932. Disclaimer filed April 12, 1943, by *Marie C. Burnett*, executrix of the estate of *Richard W. Burnett*.

Hereby enters this disclaimer to claims 1, 3, 4, and 5 in said specification.

[*Official Gazette May 25, 1943.*]